United States Patent [19]

Askeland et al.

[11] Patent Number: 5,416,145
[45] Date of Patent: May 16, 1995

[54] AQUEOUS ANIONIC DYE BASED INK JET INKS

[75] Inventors: Ronald A. Askeland, San Diego, Calif.; Sheau-Hwa Ma, Chadds Ford, Pa.; Howard Matrick, Highlands, N.J.; Michele E. Shepard, Escondido, Calif.

[73] Assignee: E. I. Du Pont de Nemours and Company, Wilmington, Del.

[21] Appl. No.: 100,354

[22] Filed: Aug. 5, 1993

Related U.S. Application Data

[63] Continuation of Ser. No. 845,332, Mar. 2, 1992, abandoned.

[51] Int. Cl.$^6$ .................. C09D 11/02; C08L 55/00
[52] U.S. Cl. .................... 524/190; 524/259; 524/533; 524/370; 106/20 D; 106/22 D; 106/22 H; 106/22 K
[58] Field of Search ............ 106/20 D, 22 R, 22 H, 106/22 C; 8/558, 557; 524/833, 505, 556, 533, 190, 259, 370

[56] References Cited

U.S. PATENT DOCUMENTS

| | | | |
|---|---|---|---|
| 3,251,744 | 5/1966 | Brunner | 167/88 |
| 4,136,076 | 1/1979 | Daniels | 260/29.6 |
| 4,270,916 | 6/1981 | Racciato | 8/527 |
| 4,334,878 | 6/1982 | Cutler et al. | 524/88 |
| 4,567,213 | 1/1986 | Bhatia et al. | 523/160 |
| 4,597,794 | 7/1986 | Ohta et al. | 106/20 |
| 4,623,689 | 11/1986 | Shintani et al. | 524/457 |
| 4,725,285 | 2/1988 | Yamanaka et al. | 8/527 |
| 5,085,698 | 2/1992 | Ma et al. | 106/20 |
| 5,139,574 | 8/1992 | Winnik et al. | 106/22 |
| 5,141,556 | 8/1992 | Matrick | 106/20 |

FOREIGN PATENT DOCUMENTS

2-103274  4/1990  Japan ................ C09D 11/00

*Primary Examiner*—Paul Lieberman
*Assistant Examiner*—Margaret Einsmann

[57] ABSTRACT

Ink jet ink compositions consisting essentially of an aqueous carrier medium; an anionic dye; and an anionic polymer have excellent decap and puddling behavior and may be used with a variety of ink jet printers such as continuous, piezoelectric, drop-on-demand and thermal or bubble jet drop-on-demand, and are particularly adapted for use in thermal ink jet printers.

11 Claims, No Drawings

AQUEOUS ANIONIC DYE BASED INK JET INKS

CROSS-REFERENCE TO RELATED APPLICATIONS

This application is a file wrapper continuation of U.S. application Ser. No. 07/845,332, filed Mar. 2, 1992, now abandoned.

FIELD OF THE INVENTION

This invention relates to aqueous inks for ink jet printers. More particularly, this invention relates to aqueous anionic dye-containing ink jet inks having substantial freedom from puddling and improved decap properties.

BACKGROUND OF THE INVENTION

Ink jet printing is a non-impact printing process in which a digital signal produces droplets of ink on media substrates such as paper or transparency films. Ink jet is widely used in industrial and office applications. Thermal or bubble jet drop-on-demand ink jet printers are the generally accepted medium price printers for personal computers. These printers have been widely accepted due to their high print quality, low cost, relatively quiet operation, environmental safety and color graphic capability.

High dot gain inks are desirable for ink jet printing because they give a large dot size for a given drop volume. The major advantage is that lower drop volumes can be used for a given printing application, resulting in lower cost per copy, reduced paper cockle and reduced amount of ink on transparency film. Most high dot gain inks have low surface tension which causes the ink to spread across the surface of the top plate of the pen cartridge, or so-called "puddling." The ink drops must fire through the puddles, which results in misdirected drops and streaking of images, and lowers printhead reliability.

A critical requirement for an ink jet ink is the ability to remain in a fluid condition in a pen opening on exposure to air, so-called "decap" conditions. This allows a pen to function after a period of non-use ("short-term decap") or during operation of infrequently utilized nozzles ("long-term decap"). A major concern with all ink jet printers is pluggage of nozzles during operation and between operations. This is caused by evaporation of an organic solvent or water from the surface of the nozzle. In dye containing inks, this can cause crystallization or precipitation of the dye or other solids, commonly referred to as "crusting".

Initial evaporation generally causes an increase in viscosity which affects the ability of the nozzle to fire a drop of ink since ink jet pens are designed to operate within specific viscosity ranges. The inception of crusting may cause distortion of the image, which may appear as a drop of ink which is displaced from its intended position or a splitting of the ink drop into two or more droplets displaced from the intended target position. On occasion, the drop may reach its intended position but at a lower drop volume, producing a lower optical density image. Ultimately the plugged nozzle will fail to fire and no image will be generated.

Several methods of addressing the crusting problems are known in the art. For example, most ink jet printers are designed to prevent excessive evaporation of solvent from pen nozzles by seating the pen cartridge in an air tight chamber when not in use. These devices become ineffective with continued printer use because deposits form at the rubber seals and the system loses its airtight condition. Another known method is to employ a wiper that removes solids formed at the surface of the nozzle. This device is often ineffective because the depth or hardness of the plug resists mechanical removal. It is also known to use forced air or vacuum suction to clear the nozzle. These methods are often inefficient and add considerable expense to the cost of the printer.

A commonly used method to clear the plug is to fire the pen in a non-image mode, i.e. into a collection receptacle or "spittoon". While this solution is the most effective remedy, it requires that the ink form a "soft" plug, i.e., one which is mechanically or cohesively weak.

Other attempts have been made to solve the decap problem by adding hygroscopic agents which reduce the rate of water evaporation by their ability to pick up water vapor from the air. While some improvement has been realized with this approach, a total solution to this problem has not been achieved. An alternative method of using a polymer blend of polyvinylpyrrolidone/polyvinylacetate copolymers and polyvinylpyrrolidone/poly(dimethylaminoethyl methacrylate) copolymers to solve the problem has been disclosed by Bearss et al in U.S. Pat. No. 4,791,165. The polymer blend forms a soft plug in the orifice of the ink jet pen and prevents further evaporation of the volatile components in the aqueous carrier. The soft plug is readily blown out upon ejection of ink droplets. However, a disadvantage of this method is that the use of the positively charged polymers tends to precipitate the anionic dyes which are most commonly used in aqueous ink jet inks.

SUMMARY OF THE INVENTION

In accordance with this invention there is provided an aqueous ink jet ink composition having improved crusting properties and being substantially free from puddling, said ink composition consisting essentially of:
(a) an aqueous carrier medium, present in a major amount;
(b) an anionic dye; and
(c) a decap improving and anti-puddling additive comprising an anionic polymer.

The inks of the invention have extended long term decap or crusting times and substantially eliminate puddling without adverse effects on other performance features, such as print quality. The ink jet inks may be used with a variety of ink jet printers including continuous, piezoelectric, drop-on-demand and thermal or bubble jet drop-on-demand, and are particularly suited for use in thermal ink jet printers. The inks are stable over long periods, both in storage and in the printer. The inks may be adapted to the requirements of a particular ink jet printer to provide a balance of light stability, smear resistance, viscosity, surface tension, optical density, and crust resistance.

DETAILED DESCRIPTION OF THE INVENTION

A critical measured property for an ink jet ink is the "decap" time, which describes the ease of removal of the moisture-depleted ink that forms as a result of exposure of the pen nozzles to air ("decapped pen"). Recoverability can be described by the number of drops per nozzle that must be fired before all pen nozzles are firing with appropriate volume and velocity. If an ink is to be used in a printer with primer capabilities, acceptable long-term decap recoverability (i.e., no permanently blocked nozzles) may involve one or two primes.

Short-term decap is the length of time a pen can be exposed to air before noticeable degreadations occur in the first, fifth or thirty-second drops fired. Frequently, addition of a polymeric additive to enhance long-term decap or lessen puddling adversely effects the ink's short-term decap. The polymeric compounds described herein, however, result in ink jet inks that demonstrate improved puddling and/or improved long-term decap while maintaining useful short-term decap performances.

AQUEOUS CARRIER MEDIUM

The aqueous carrier medium is the carrier vehicle for the ink compositions of this invention and comprises water (preferably deionized water) or a mixture of water and at least one water soluble organic solvent. The aqueous carrier medium is present in a major amount of the ink composition, i.e., in the range of approximately 65 to 99.89%, preferably approximately 75 to 95% based on total weight of the ink.

Representative examples of water-soluble organic solvents are disclosed in U.S. Pat. No. 5,085,698, the disclosure of which is incorporated herein by reference. Selection of a suitable mixture of water and water soluble organic solvent depends upon the requirements of the specific application, such as desired surface tension and viscosity, the selected dye, drying time of the ink, and the type of substrate onto which the ink will be printed.

A mixture of an alcohol having at least one hydroxyl group (diethylene glycol, triethylene glycol, butyl carbitol, etc.) and deionized water is preferred as the aqueous carrier medium. The aqueous carrier medium usually contains from about 5% to about 95% water, with the remainder (i.e., 95% to about 5%) being the water soluble organic solvent. The preferred compositions are approximately 60% to about 95% water, based on the total weight of the aqueous carrier medium. Most preferably, the aqueous vehicle comprises about 90% water and the balance a glycol ether such as butyl carbitol. Higher concentrations of organic solvents may result in poor print quality. Lower concentrations will lead to drying out of the printhead and "crusting" of the ink.

ANIONIC DYES

Anionic dyes are those dyes which in aqueous solution yield colored anions. Such dyes are well known to those of ordinary skill in the art and typically contain carboxylic or sulfonic acid groups as the ionic moiety. The types of anionic dyes most useful in this invention are for example Acid, Direct, Food, Mordant, and Reactive dyes. Anionic dyes are selected from the group consisting of nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds.

The color and amount of anionic dye used in the ink composition is largely a function of choice, being primarily dependant upon the desired color of the print achieved with the ink, the purity of the dye and its strength. Low concentrations of dye may not give adequate color vividness. High concentrations may result in poor printhead performance or unacceptably dark colors. The anionic dye is present in the amount of 0.01 to 10%, by weight, preferably 0.05 to 8% by weight, more preferably 1 to 5%, by weight, based on the total weight of the ink.

ANIONIC POLYMER

The anionic polymers disclosed herein serve two important functions in the ink composition of this invention. First, the polymers have been shown to improve the decap properties of the inks, particularly the long term decap properties. Second, the polymers have been shown to substantially eliminate puddling of the inks.

Anionic polymers useful within the scope of this invention comprise a backbone prepared from ethylenically unsaturated units and having at least one pendant ionic moiety derived from the anionic unit on the monomer and being of the general formula:

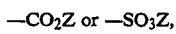
$-CO_2Z$ or $-SO_3Z$, wherein Z is selected from conjugate acids of organic bases, alkali metal ions, ammonium ion, and tetraalkylammonium ions. For the anionic polymer, the carboxylate or sulfonate units can be in the required ionic configurations as polymerized, or more typically and preferably, can be the free acids which are converted to the carboxylate or sulfonate form after the formation of the polymer structure. Representative functional monomers that may be selected include, but are not limited to, the following: methacrylic acid (MAA), acrylic acid, maleic acid, itaconic acid, monoesters of maleic acid, monoesters of itaconic acid, 4-styrene sulfonic acid, 2-sulfoethyl methacrylate, 3-sulfopropyl methacrylamide, maleic anhydride, methacrylic anhydride, and itaconic anhydride. Homopolymers or copolymers of methacrylic acid are preferred.

The acid containing polymer may be made directly or may be made from blocked monomers with the blocking group being removed after polymerization. Examples of blocked monomers that generate acrylic or methacrylic acid after removal of the blocking group include: trimethylsilyl methacrylate (TMS-MAA), trimethylsilyl acrylate, 1-butoxyethyl methacrylate, 1-ethoxyethyl methacrylate, 1-butoxyethyl acrylate, 1-ethoxyethyl acrylate, 2-tetrahydropyranyl acrylate, and 2-tetrahydropropanyl methacrylate.

To solubilize the anionic polymer into the aqueous medium, it may be necessary to make salts of the acid. Salts of the acid monomers can be made with the counter component being selected from organic bases such as mono-, di-, or tri-methylamine, morpholine, n-methyl morpholine; alcohol amines such as dimethylethanolamine (DMEA), methyldiethanolamine, mono-, di-, and triethanolamine; pyridine; ammonium hydroxide; tetraalkylammonium salts such as tetramethyl- or tetraethylammonium hydroxide; alkali metals such as lithium, sodium and potassium; and mixtures thereof. Preferred neutralizing agents include dimethylethanolamine and sodium and potassium hydroxides, with potassium hydroxide being particularly preferred for inks to be used in thermal ink jet printers. Amphoteric polymers, that is polymer that contains both an acid group and an amino group, may be used as is or can be neutralized with addition of base. The anionic polymers may also include non-ionic monomers.

The anionic polymer may be a homopolymer, random polymer, AB block polymer, BAB triblock polymer, or branched or graft polymer. Methods of preparing such polymers are numerous and well known to those skilled in the art, such as, for example, by free radical solution, emulsion, suspension, bulk polymerization and the like (using a chain transfer agent, if necessary), or by stepwise polymerization processes. The graft form may be prepared by copolymerizing a preformed macromonomer or by grafting onto an existing polymeric backbone. The AB and BAB block polymers are advantageously produced by stepwise polymerization process such as anionic or group transfer polymerization as described in Webster, U.S. Pat. No. 4,508,880, the disclosure of which is incorporated herein by reference. Polymers so produced have precisely controlled molecular weight, block sizes and very narrow molecular weight distributions.

Useful anionic polymers include copolymers of styrene and maleic acid and their mono esters, AB block polymers wherein the A block comprises homopolymers or copolymers prepared from methyl methacrylate (MMA) or butyl methacrylate (BMA) and a B block comprises homopolymers or copolymers prepared from methacrylic acid. Particularly preferred anionic polymers are AB block polymers of BMA//BMA/MAA (5//2.5/5), MMA//MMA/MAA (10//5/7.5), and BMA//MAA (10//10), wherein a double slash indicates a separation between blocks, a single slash indicates a random copolymer, and the numerical values indicate the degree of polymerization of each monomer.

The amount of polymer and choice of counter ion depends on the desired structure, molecular weight and other properties of the polymer, and upon the other components of the ink composition. Block polymers that are selected in practicing the invention have a number average molecular weight of below 20,000, preferably below 10,000, and typically in the range of 1,000 to 3,000. Preferred block polymers have number average molecular weights in the range of 500 to 1500 for each A and B block.

The higher molecular weight polymers are more effective at increasing the viscosity of the ink, but the short-term decap values decrease with such polymers. The lower molecular weight polymers are preferred because, even though a higher concentration of polymer is required to prevent puddling, the inks exhibit acceptable shortterm decap properties.

Generally, the anionic polymer is present in the range of approximately 0.05% to 10%, by weight, based on the weight of the total ink composition, preferably in the range of approximately 0.1% to 8%. At higher polymer concentrations, the ink color density will be unacceptable and it will become difficult to maintain desired ink viscosity.

OTHER INGREDIENTS

The ink may contain other ingredients which are well known in the art. Surfactants may be used to alter surface tension as well as maximize penetration, and may be anionic, amphoteric or nonionic. Useful surfactants may be selected from *McCutcheon's Emulsifiers and Detergents*, Manufacturing Confectioners Publishing Company, Glen Rock, N.J. The choice of surfactant is highly dependant on the type of substrate to be printed. It is expected that one skilled in the art can select the appropriate surfactant for the specific substrate to be used in printing. In aqueous inks, the surfactants may be present in the amount of 0.01–5% and preferably 0.2–2%.

Biocides may also be present to inhibit growth of microorganisms, such as Dowicides[200] (Dow Chemical, Midland, Mich. 48674), Omidines® (Olin Corp., Cheshire, Conn. 06410), Nuosept® (Huls America, Inc., Piscataway, N.J.), Nopcocides® (Henkel Corp, Ambler, Pa. 19002), Troysans® (Troy Chemical Corp., Newark, N.J. 17105) and sodium benzoate, for example. In addition, sequestering or chelating agents, such as EDTA, may also be included to eliminate deleterious effects of heavy metal impurities. Optionally, other acrylic and non-acrylic polymers, may be added to improve properties such as water fastness and smear resistance.

INK PROPERTIES

Jet velocity, separation length of the droplets, drop size, and stream stability are greatly affected by the surface tension and the viscosity of the ink. Suitable ink jet inks should have a surface tension in the range of about 20 dyne/cm to about 70 dyne/cm at 20° C. Acceptable viscosities are no greater than 20 cP, and preferably in the range of about 1.0 cP to about 10.0 cP at 20° C.

The inks of this invention have physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric, drop-on-demand and thermal or bubble jet drop-on-demand, and are particularly adapted for use in thermal ink jet printers. They also have excellent long term storage stability. Fixing the ink on the image recording material, such as, paper, fabric, film, etc., can be carried out rapidly and accurately.

Images printed with the inks of the present invention have clear color tones and high density. Furthermore, the inks have a pH in the range of from about 6 to about 9 and do not corrode components of the ink jet printing device, and they are essentially odorless.

EXAMPLES

This invention will now be further illustrated by the following examples, in which parts and percentages are by weight unless otherwise stated. The anionic polymers used in the following examples, unless otherwise noted, were butyl methacrylate//methacrylic acid (BMA//MAA) (10//10) AB block polymers (mol. wt. 2400) prepared using the following procedure:

A 12-liter flask was equipped with a mechanical stirrer, thermometer, $N_2$ inlet, drying tube outlet, and addition funnels. Tetrahydrofuran ("THF"), 3750 gm, and p-xylene, 7.4 gm, were charged to the flask. A tetrabutyl ammonium m-chlorobenzoate catalyst (3.0 ml of a 1.0M solution in acetonitrile) was then added. Initiator, 1,1-bis(trimethylsiloxy)-2-methyl propene, 291.1 gm (1.25M) was injected. Feed I [tetrabutyl ammonium m-chlorobenzoate, 3.0 ml of a 1.0M solution in acetonitrile] was started at zero minutes and added over 150 minutes. Feed II [trimethytsilyl methacrylate, 1976 gm (12.5M)] was started at zero minutes and added over 35 minutes. One hundred and eighty minutes after Feed II was completed (over 99 % of the monomers had reacted) Feed III [butyl methacrylate, 1772 gm (12.5M) was started and added over 30 minutes.

At 400 minutes, 780 gm of dry methanol were added to the above solution and distillation begun. During the first stage of distillation, 1300.0 gm of material with a boiling point of below 55° C. were removed from the flask. The theoretical amount of methoxytrimethylsilane (BP=54° C.) to be removed was 1144.0 gm. Distillation continued during the second stage while the boiling point increased to 76° C. 5100 gm of i-propanol was added during the second stage of distillation. A total of 8007 gm of solvent were removed.

This procedure resulted in a 52.5% BMA//MMA AB block polymer solution in THF and i-propranol.

NEUTRALIZATION PROCEDURES

The following procedures were used to neutralize the block polymer solution prepared in accordance with the above. The same procedures may also be used to neutralize other anionic polymers within the scope of this invention.

Procedure A: Tetramethylammonium Hydroxide 23.8 gm of block polymer solution was mixed with 18.6 gm of tetramethylammonium hydroxide solution (25% solution in deionized water) and 82.6 gm of deionized water until a homogeneous 10% polymer solution was obtained. (88% neutralization)

Procedure B: Potassium Hydroxide 24.3 gm of block polymer solution was mixed with 6.51 gm of potassium hydroxide solution (45% aqueous solution) and 54.2 gm of deionized water until a homogeneous 15% polymer solution was obtained. After neutralization, the solution was reduced to 10% polymer with 42.5 gm of deionized water. (88% neutralization)

Procedure C: Choline Hydroxide 22.8 gm of block polymer solution was mixed with 11.9 gm of choline hydroxide solution (50% aqueous solution) and 85.3 gm of deionized water until a homogeneous 10% polymer solution was obtained. (88% neutralization)

Procedure D: Sodium Hydroxide 25.7 gm of block polymer solution, 4.34 gm of sodium hydroxide solution (45% aqueous solution) and 60.0 gm of deionized water were mixed together until a homogeneous 15% polymer solution was obtained, then 45.0 gm of deionized water was added to obtain a 10% polymer solution. (88% neutralization)

Procedure Lithium Hydroxide 2.23 gm of solid lithium hydroxide monohydrate, 24.7 gm of block polymer solution and 103.1 gm of deionized water were mixed until a homogeneous 10% polymer solution was obtained. (88% neutralization)

Procedure F: N,N-Dimethylethanolamine 4.10 gm of N,N-Dimethylethanolamine was mixed with 19.5 gm of block polymer solution and 76.4 gm of deionized water until a homogeneous 10% solution was obtained. (100% neutralization)

EXAMPLE 1

Two black ink jet inks (Samples 1 and 2) were prepared using 2.5% of Food black 2 (trimethylammonium salt, 14.5% purified dye concentrate), 95% of deionized water and 2.5% of a polymer. The polymer in Sample 1 comprised a block polymer prepared as above and neutralized by Procedure F. Sample 2 contained SMA 1440 resin, N,N-dimethylethanolammonium salt (Sartomer Company, West Chester, Pa.) as the polymer. A control comprised 2.5% of Food black 2 as above and 97.5% deionized water.

Each of the above inks was prepared by stirring the components to completely dissolve the solids. The inks were filled into thermal ink jet ink pens having a 42 μm resistor and a 33 μm orifice and printed with a DeskJet ink jet printer (Hewlett-Packard Company, Palo Alto, Calif.). All of the above inks, including the control, printed smoothly. The results of the crusting behavior for these inks are described in Table 1.

TABLE 1

|  | 4 DAYS | 9 DAYS | 20 DAYS | 3 MONTHS |
| --- | --- | --- | --- | --- |
| SAMPLE 1 | 1 line printed with misdirected dots before recovery of all nozzles. | 1 line printed with about ½ of dots missing before all nozzles recovered. | 1 line printed with about ½ of dots missing before all nozzles recovered. | Most nozzles recovered by the 3rd line and all nozzles recovered ½ page into printing. Print was smooth with good density and sharp edges. |
| SAMPLE 2 | No data | No data | 5 lines printed with all dots missing, followed by about ½ page printed with only about 50% of dots. All nozzles recovered at the end of the page. | All except 2 nozzles recovered at end of page. All nozzles recovered with a single priming action. Printed smoothly with good density and sharp edges. |
| CONTROL | 2 lines printed with misdirected dots before all nozzles recovered. | 2 lines printed with all dots missing, followed by 4 lines printed with only about 50% of dots before recovery of all nozzles. | 4 lines printed with all dots missing, followed by about ½ page of printing with only 50% of dots. A few dots are still missing at end of page. | All nozzles blocked. With very extensive priming, only ½ of nozzles recovered. |

Notes:
1) The pens were left uncapped for the lengths of time indicated in the Table. The print test was carried out with a Hewlett-Packard DeskJet ink jet printer with the software modified so that the pen did not eject any ink droplets before printing. The pattern used in the print test was the standard self test pattern installed in the printer.
2) The priming was accomplished by applying a slight positive pressure from the back side of the pen cartridge with a syringe to push a small amount of ink through all nozzles.

Example 2

Five cyan ink jet inks (Samples 3–7) were prepared by dissolving 2.25% Acid Blue 9 (CAS No. 3844-45-9) and 8.0% of block polymer in an aqueous solution containing 8.0% butyl carbitol and 0.50% Silwet ® L-77 (Union Carbide). A control was prepared in the same manner without any polymer. In each of Samples 3–7, the block polymer was neutralized as indicated in Table 2.

TABLE 2

| Sample No. | Neutralizing Agent | Neutralizing Procedure |
|---|---|---|
| Control | — | — |
| 3 | Tetramethylammonium Hydroxide | A |
| 4 | Choline Hydroxide | C |
| 5 | Potassium Hydroxide | B |
| 6 | Sodium Hydroxide | D |
| 7 | Lithium Hydroxide | E |

The inks were printed with a Hewlett-Packard DeskJet printer and tested for decap at ambient temperatures by the procedure outlined earlier, and puddling performance on a strobed microscope system. Virtually no puddle formation was seen for Samples 3–7. The pen containing the control had ink covering the top plate surface while the pens containing Samples 3–7 had small puddles that stayed within 50–100 μm of the orifice opening. Short-term decap results are outlined in Table 3 below.

TABLE 3

| Sample No. | Decap Time (Seconds) 1st Drop | 5th Drop | 32nd Drop |
|---|---|---|---|
| Control | 780 | 2400 | 16800 |
| 3 | 130 | 140 | >6600 |
| 4 | 60 | 80 | >12000 |
| 5 | 60 | 80 | >15000 |
| 6 | 80 | 100 | 15000 |
| 7 | 70 | 190 | >19200 |

Example 3

A control ink was prepared in accordance with Example 1 of U.S. Pat. No. 5,062,893 comprising 1.1% of each of Dyes I and II dissolved in an aqueous solution of 7.5% 2-pyrrolidone, 0.1% ammonium phosphate, 0.3% biocide, 0.2% TRIS buffer and 0.2% BORAX buffer. To this control was added 2% (Sample 8) or 4% (Sample 9) of dry, unneutralized, BMA//BMA/MMA (10//5/10) block polymer (mol. wt. 3,000) prepared in accordance with Preparation 3 of U.S. Ser. No. 07/508145, filed Apr. 11, 1990. The polymer was dissolved by addition of a 10% aqueous KOH solution (pH=8). The inks were loaded into thermal ink jet pens and printed with a Hewlett-Packard DeskJet printer. The short-term decap and print quality results are set forth in Table 4.

TABLE 4

| Sample No. | Decap Time (Seconds) 1st Drop | 5th Drop | 32nd Drop | Print Quality |
|---|---|---|---|---|
| Control | 120 | >900 | >900 | Crisp |
| 8 | 120 | 180 | 450 | Crisp |
| 9 | 60 | 90 | 120 | Fuzzy |

Three pens of the control ink (A–C) and three pens of Sample 8 ink (Samples 8a–8c) were print tested with a DeskJet printer and then stored uncapped for three days at 40° C. Each pen was then permitted a maximum of 2 primes (see Notes to Table 1) to recover the use of all 50 nozzles. Pens exhibiting unrecovered nozzles after 2 primes were considered terminal failures. The results are reported in Table 5.

TABLE 5

| Sample No. | Number of Primes | Number of Unrecovered Nozzles |
|---|---|---|
| A | 1 | 13 |
|   | 2 | 4 |
| B | 1 | 50 |
|   | 2 | 2 |
| C | 1 | 50 |
|   | 2 | 3 |
| 8a | 1 | 1 |
|   | 2 | 0 |
| 8b | 1 | 2 |
|   | 2 | 0 |
| 8c | 1 | 1 |
|   | 2 | 0 |

What is claimed is:

1. In an ink jet ink composition consisting essentially of a solution of an aqueous carrier medium and an anionic dye, the improvement wherein decap and anti-puddling of the ink is improved by including in said composition an aqueous soluble salt of an anionic acrylate or methacrylate polymer having a number average molecular weight below 10,000 selected from the group consisting of AB block polymers and BAB triblock polymers.

2. The ink composition of claim 1 wherein the anionic polymer is an AB block polymer.

3. The ink composition of claim 2 wherein the AB block polymer consists of a A block comprising homopolymers or copolymers prepared from methylmethacrylate or butylmethacrylate and a B block comprising homopolymers or copolymers prepared from methacrylic acid.

4. The ink composition of claim 3 wherein the A block is a homopolymer of methylmethacrylate and wherein the B block is a copolymer of methylmethacrylate and methacrylic acid.

5. The ink composition of claim 3 wherein the A block is a homopolymer of butylmethacrylate and wherein the B block is a copolymer of butylmethacrylate and methacrylic acid.

6. The ink composition of claim 3 wherein the A block is a homopolymer of butylmethacrylate and the B block is a homopolymer of methacrylic acid.

7. The ink composition of claim 3 wherein the A block is a copolymer of butylmethacrylate and methylmethacrylate and the B block is a homopolymer of methacrylic acid.

8. The ink composition of claims 1 or 2 wherein the anionic dye is selected from the group consisting of nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds.

9. The ink composition of claims 1 or 2 wherein said ink contains approximately 0.01 to 10% by weight anionic dye, 0.05 to 10% by weight anionic polymer, and 65 to 99.89% by weight aqueous carrier medium based on the total weight of the ink.

10. The ink composition of claim 1 wherein said ink containing approximately 1 to 5% anionic dye, 0.1 to 8% anionic polymer, and 75 to 95% aqueous carrier medium.

11. The ink composition of claim 2 wherein the anionic polymer has a number average molecular weight in the range of 1,000 to 3,000.

* * * * *